Nov. 21, 1950          L. I. FAGGEN          2,530,384
ARMREST FOR VEHICLE USE
Filed Aug. 18, 1948
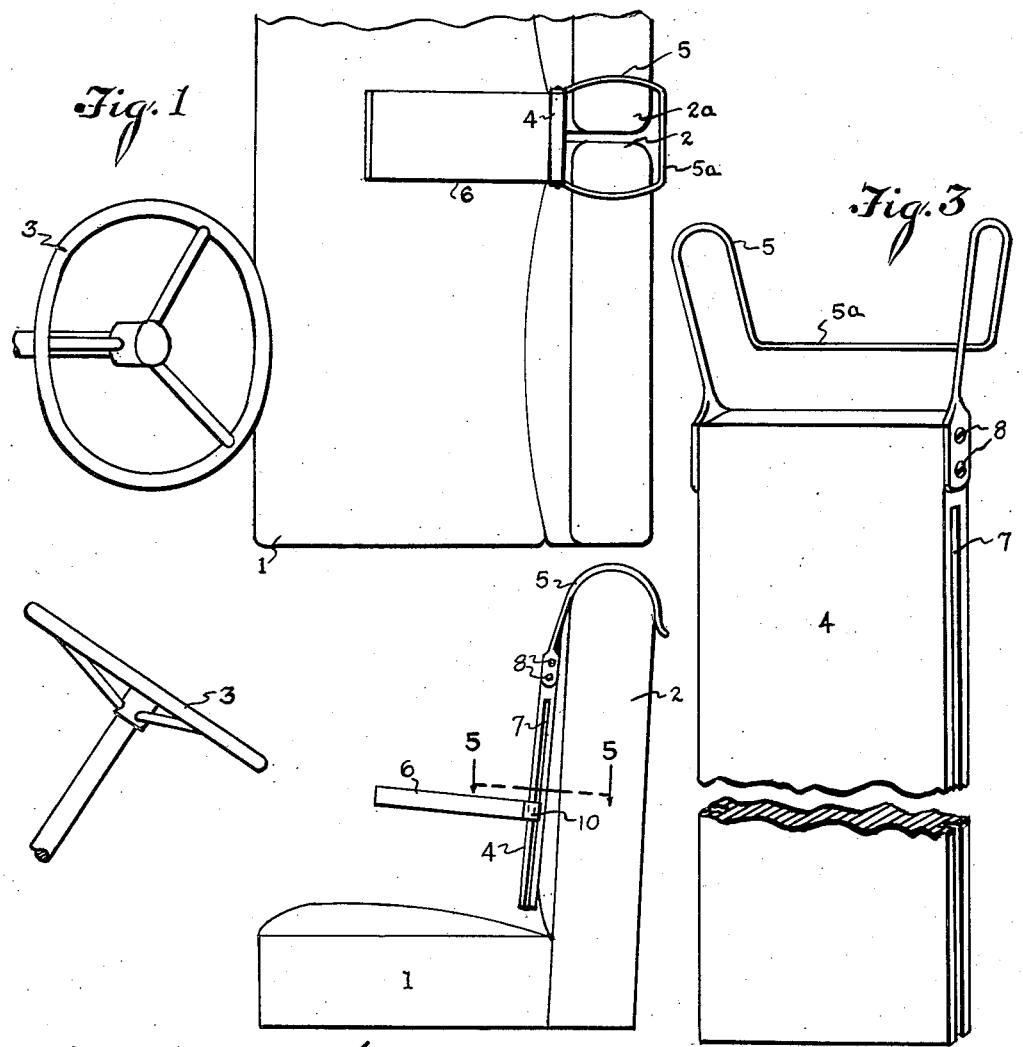
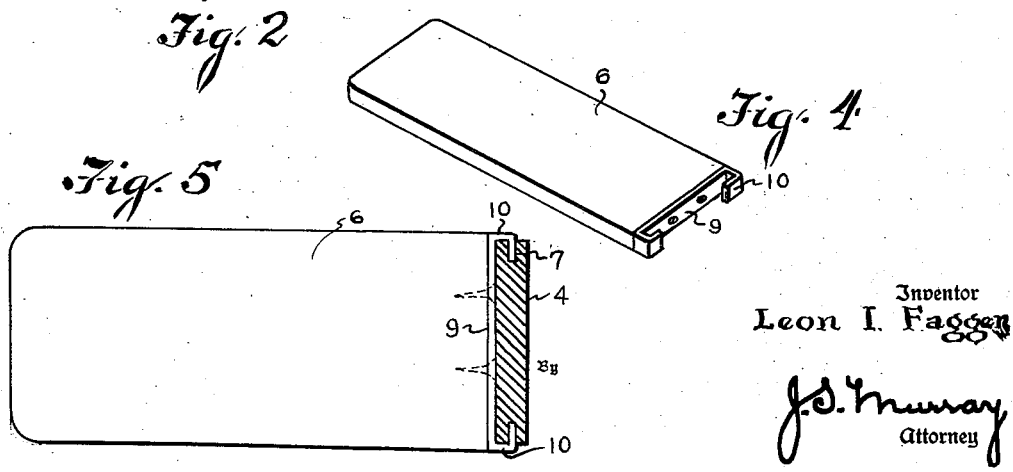
Inventor
Leon I. Faggen
J. S. Murray
Attorney Patented Nov. 21, 1950

2,530,384

UNITED STATES PATENT OFFICE 2,530,384

ARMREST FOR VEHICLE USE

Leon I. Faggen, Detroit, Mich.

Application August 18, 1948, Serial No. 44,930

3 Claims. (Cl. 155—112)

This invention relates to arm rests for vehicle use and particularly arm rests for motor vehicle drivers.

An object of the invention is to provide for adjustment of an arm rest to any convenient height more easily and rapidly than has heretofore been feasible.

Another object is to mount an arm rest for vertical adjustment on a suitable support and to render such rest quickly and easily detachable from such support.

Another object is to provide an arm rest with a supporting hook suited to fit over adjoined back members of a vehicle seat in a straddling relation to their juncture.

These and various other objects are attained by the construction hereinafter described and illustrated in the accompanying drawing, wherein:

Fig. 1 is a top plan view of the front seat of a motor vehicle, showing the installation of my improved arm rest.

Fig. 2 is a side elevational view of the same.

Fig. 3 is a perspective view of an upright on which the arm rest is normally carried.

Fig. 4 is a perspective view of the arm rest.

Fig. 5 is a sectional view, taken on the line 5—5 of Fig. 2, showing the arm rest on its support.

In these views, the reference character 1 designates the front seat of a motor vehicle, such seat having two back members 2 and 2a in an adjoined end to end relation and respectively serving for the vehicle driver and a passenger at the driver's right hand. The usual steering wheel 3 is shown in front of the driver's seat.

My improved arm rest comprises an upright 4, a double hook 5 secured to and upwardly projecting from said upright to engage one or both of the members 2 and 2a, and an arm rest 6 vertically adjustable on the upright. The upright 4 is preferably formed by an elongated board having its longitudinal edges similarly centrally formed with narrow grooves 7 of a depth materially exceeding their width, and continuously extending from the lower end of the upright to its upper portion. The hook 5 is preferably formed of a single length of heavy wire having its ends straddling the upper end of the upright and fastened to the vertical edges of such end by screws 8. The wire extends upwardly from its secured ends and forms two spaced rearwardly arched portions, integrally joined by a central horizontal rear portion 5a of the wire. The hook is so proportioned as to snugly straddle the upper end of the back member 2 or of both back members 2 and 2a, as illustrated. Preferably the two arched portions have a maximum spacing at their tops, converging toward the connecting portion 5a and also toward their anchored front ends. Thus the paired arched portions have an ample spread to clear the adjoined ends of the back members 2 and 2a. The arm rest 6 is formed preferably by an elongated board, suitably upholstered, the upholstery, however, being omitted as of no inventive consequence. To one end of said board is secured a metal plate 9 having its ends forming hooks 10 projecting toward each other. The hooks 10 are so dimensioned and spaced that they may straddle the upright 4 and be received by the grooves 7 when the arm rest is set against the front face of the upright. When thus engaged with the upright, the arm rest maintains any position of vertical adjustment, due to the turning moment deriving from the weight of said rest. Such turning moment tends to tilt the hooks 10 in the grooves 7 so that they bind against the walls of such grooves, and any weight, as that of an arm resting on the board 6, increases this binding effect, creating definite assurance against accidental shifting of the rest, in use.

The chief merit of the described construction lies in its very simple yet positive provision for vertical adjustment of the arm rest and maintaining such adjustment. By relieving the weight of such rest it may be freely slid up or down so as to be instantaneously suited to the needs of a user. Also, it may be readily slid sufficiently downward to withdraw the hooks 10 from the grooves 7, being thus immediately detachable from the upright, when not needed. As clearly appears in Fig. 2, the upright has sufficient clearance from the seat 1 to readily permit the described detachment. This facilitates disposing the arm rest for use or shifting it to some place of storage, when use is intermittent. If use is to be discontinued for a considerable interval, the entire appliance may be readily unhooked from the seat and disposed for storage.

The adaptability of the described appliance for ready lateral adjustment is also a considerable asset, it being feasible to shift the hook 5 lengthwise of the seat to establish an exact position of the arm rest preferred by a user.

While shown and described as an added convenience for the driver of a motor vehicle, it is obvious that the improved arm rest is also suited to the use of a passenger, when desired.

What I claim is:

1. An attachment for a vehicle seat, comprising a vertically elongated support of substantially constant width having opposed substantially parallel longitudinal edges and tracks at such edges, each forming a groove, an arm rest forwardly extending from said support, and hooks secured to the rear end of the arm rest, straddling the support and slidably fitted in said grooves, said rest with its hooks being slidable up and down on the support, and said hooks retaining the rest in an adjusted position due to a binding effect of the hooks resulting from the gravitational turning moment of the arm rest.

2. An attachment for a vehicle seat as set forth in claim 1, said support having said edges grooved to form said tracks and the grooves extending to one end of said support.

3. An attachment for a vehicle seat as set forth in claim 1, said elongated support being a board, and said grooves extending substantially centrally in the longitudinal edges of the board.

LEON I. FAGGEN.

REFERENCES CITED

The following references are of record in the file of this patent:

UNITED STATES PATENTS

| Number | Name | Date |
| --- | --- | --- |
| 414,392 | Findley | Nov. 5, 1889 |
| 491,093 | Edgerton | Feb. 7, 1893 |
| 782,069 | Sjostrom | Feb. 7, 1905 |
| 2,184,181 | Fall | Dec. 18, 1939 |